United States Patent

[11] 3,537,344

[72] Inventors Arthur William Nixon
 Walsall, and
 Keith Stanley Thompson, Stourbridge, England
[21] Appl. No. 695,756
[22] Filed Jan. 4, 1968
[45] Patented Nov. 3, 1970
[73] Assignee Chance Brothers Limited
 Birmingham, Warwickshire, England
 a corporation of Great Britain
[32] Priority Jan. 6, 1967
[33] Great Britain
[31] No. 888/67

[54] CUTTING GLASS
 10 Claims, 4 Drawing Figs.
[52] U.S. Cl. .................................................. 83/7,
 83/10; 83/11; 33/32
[51] Int. Cl. .................................................. B26d 3/08
[50] Field of Search ........................................ 83/7, 10,
 11, 12; 225/96.5, 2; 33/32(C, D)

[56] References Cited
UNITED STATES PATENTS

| | | | |
|---|---|---|---|
| 2,601,725 | 7/1952 | Henry et al. ................. | 33/32 |
| 3,151,794 | 10/1964 | Brand ............................ | 225/96.5 |
| 3,222,963 | 12/1965 | Nabiullin et al. ............. | 83/10 |
| 3,286,893 | 11/1966 | Zellers .......................... | 225/96.5 |

Primary Examiner—James M. Meister
Attorney—Morrison, Kennedy and Campbell

ABSTRACT: Apparatus for scoring a plurality of intersecting lines on a glass sheet comprises a cutting table movable on first guide means in a first direction under a fixed bank of scoring tools whereby a glass sheet held onto the table is scored with a first plurality of parallel lines, and a movable bank of scoring tools which is mounted on a carriage movable over the cutting table on second guide means to score a second plurality of lines on the glass sheet intersecting with the first plurality of lines.

Patented Nov. 3, 1970    3,537,344
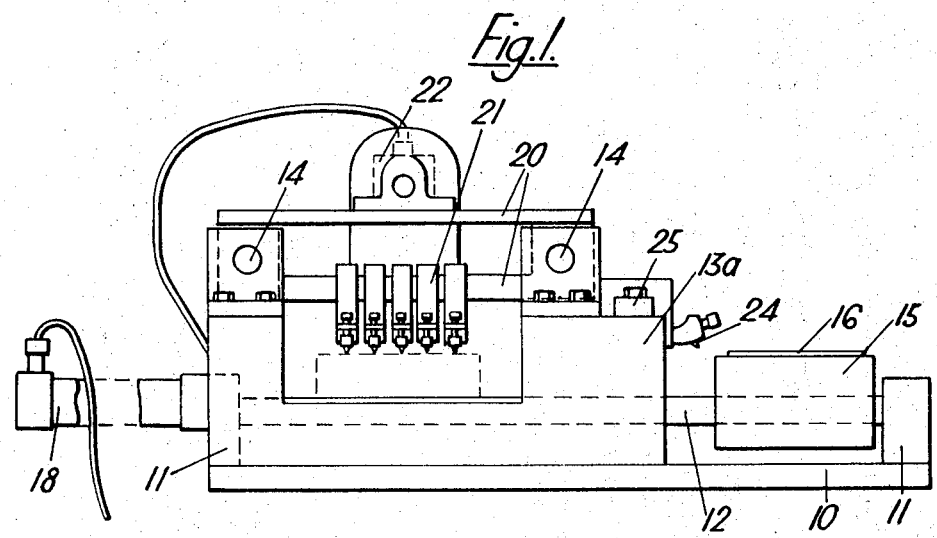
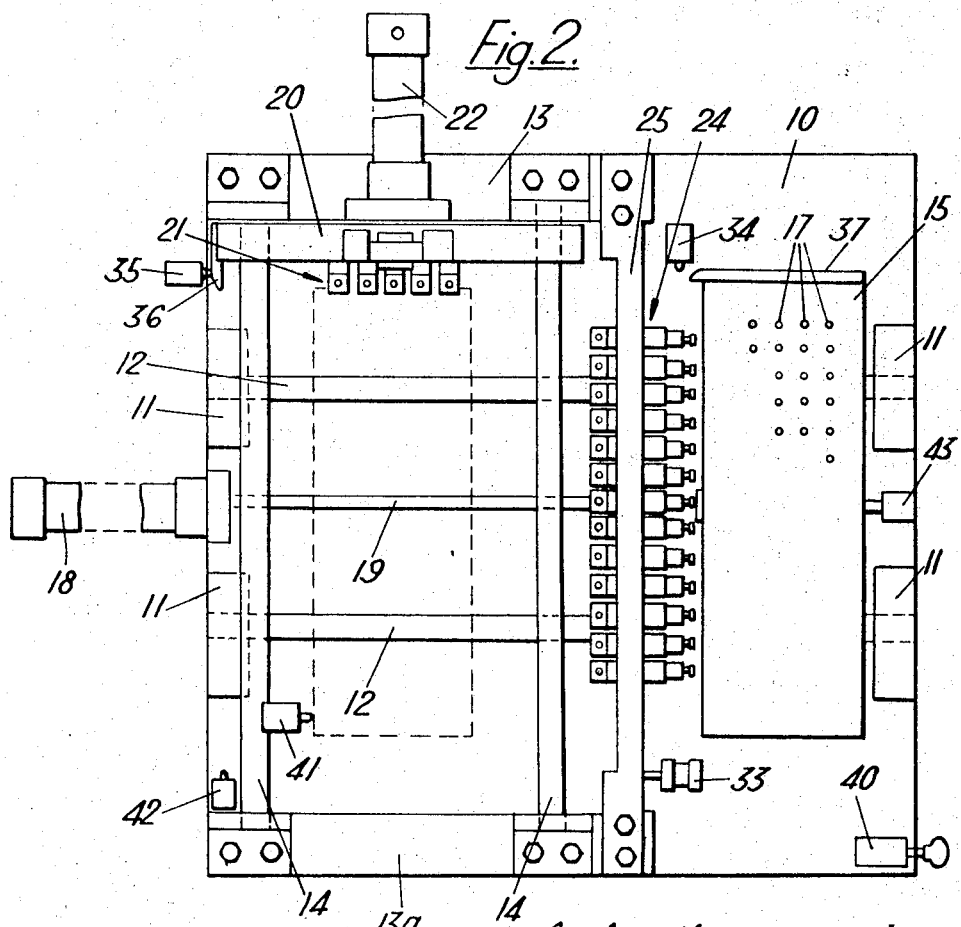
Inventors
Arthur William Nixon and
Keith Stanley Thompson
By
Morrison, Kennedy & Campbell
Attorneys

CUTTING GLASS

BACKGROUND OF THE INVENTION

1. Field of the Invention

The present invention relates to the cutting of glass sheets into a plurality of small parts, and is particularly useful for cutting thin glass sheets into a large number of square or rectangular parts for use as microscope slide cover slips.

2. Description of the Prior Art

Hitherto microscope slide cover slips have been produced by manually scoring a grid pattern of lines on a thin glass sheet, and then breaking the sheet along the lines to give a multiplicity of square or rectangular pieces. The present invention provides a method and apparatus which enables the score lines to be produced more rapidly than by purely manual scoring.

According to one aspect of the present invention, a method of scoring a plurality of intersecting lines on a glass sheet, e.g. for producing microscope cover slips from a thin glass sheet, comprises the steps of locating a glass sheet on a cutting table, applying vacuum to ports in said table to hold the glass sheet in position thereon, effecting relative movement between said table and a first bank of scoring tools to score a first plurality of parallel lines in one direction on the glass sheet, then effecting relative movement between said table and a second bank of scoring tools to score on said glass sheet a second plurality of parallel lines intersecting said first lines, releasing the vacuum holding the glass sheet on the table, and removing the scored glass sheet from the table.

The relative movement between said table and one bank of scoring tools may be caused by traversing the one bank of tools over the glass sheet while the cutting table is held stationary, and the relative movement between the cutting table and the other bank of scoring tools may be caused by traversing the cutting table under said other bank of scoring tools, which other bank remains stationary. The relative movements between the cutting table and the banks of scoring tools are preferably effected firstly at a slow approach speed until the tools contact the edge of the glass sheet and have attained the correct height for scoring, and subsequently at a faster speed during the scoring operation.

According to another aspect of the invention, apparatus for scoring a plurality of intersecting lines on a glass sheet comprises a base, first guide means mounted on the base, a cutting table movable in a first direction on said first guide means, the cutting table having ports in its surface connected to a vacuum line for holding a glass sheet on the cutting table surface by vacuum, second guide means mounted on said base, a carriage movable on said second guide means in a second direction over the cutting table, a movable bank of scoring tools mounted on said carriage and arranged to score a plurality of parallel lines on the glass sheet, and a fixed bank of scoring tools so positioned as to score a plurality of parallel lines on the glass sheet in said first direction as the cutting table is moved along said first guide means.

In a preferred arrangement, the first guide means allow movement of the cutting table under the fixed bank of scoring tools from a first loading and unloading position to a second position in which a glass sheet on the cutting table may be traversed by the movable bank of scoring tools. The cutting table and the movable bank of scoring tools may be movable by pneumatic cylinders having flow-regulating means which provide a slow approach speed until the scoring tools have contacted the edge of the glass sheet, and a faster speed during scoring.

To ensure full contact between the glass sheet and the surface of the cutting table before scoring is commenced, a roller having a resilient surface may be disposed transversely to the direction of movement of the cutting table, and so positioned above the table as to contact the glass sheet as the table moves from the loading and unloading position to the position in which it is scored by the movable bank of tools.

In a further form of this apparatus according to the invention, several cutting tables are mounted on an endless conveyor belt, each cutting table having ports in its surface for holding a glass sheet on the cutting table surface by vacuum, the conveyor belt being associated with said first guide means for the cutting table whereby the cutting table is guided in a first direction beneath said movable and fixed banks of scoring tools, said movable bank of scoring tools being mounted for movement transverse to the direction of movement of the cutting tables so as to score a plurality of parallel lines on the glass sheet in said second direction while the conveyor is stationary, and the fixed bank of scoring tools being positioned so as to score a further plurality of lines on the glass sheet in said first direction when the conveyor moves relatively to the fixed bank.

BRIEF DESCRIPTION OF THE DRAWINGS

FIG. 1 shows a side elevation of a first type of apparatus according to the invention;

FIG. 2 shows a plan view of the apparatus shown in FIG. 1;

DESCRIPTION OF THE PREFERRED EMBODIMENT

Figure 3:
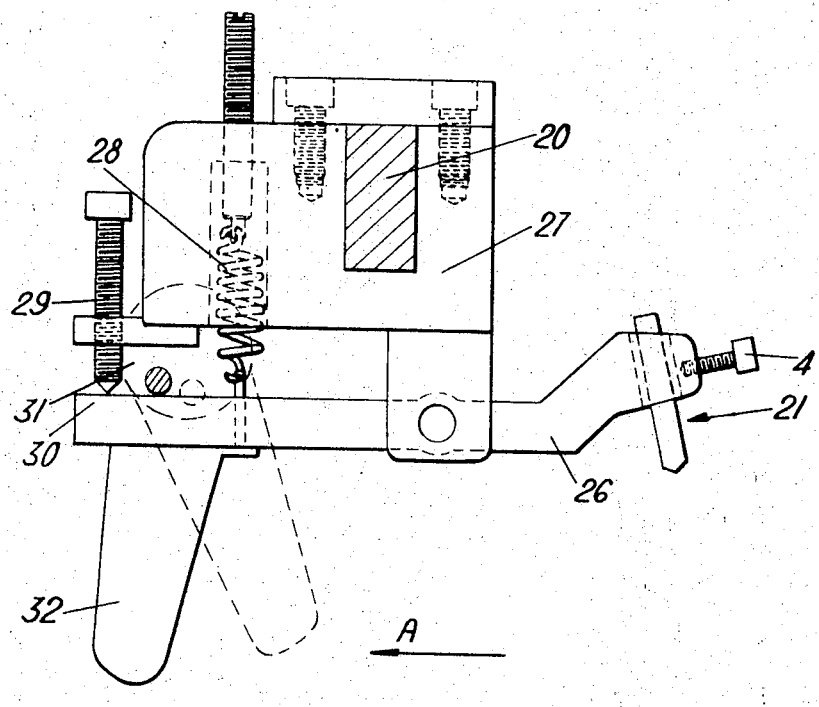
FIG. 3 shows the detail of one tool holder for the apparatus of FIGS. 1 and 2.

Referring to FIGS. 1, 2 and 3, a base 10 has lugs 11 supporting parallel guide bars 12, and side members 13 and 13a attached to the base 10 support further parallel guide bars 14 which are perpendicular to guide bars 12.

The guide bars 12 constitute guide means for a cutting table 15, which has a flat upper surface for the reception of a glass sheet 16 which can be located against stops (not shown). The surface of the cutting table is provided with a plurality of ports 17 set on a regular pattern, these ports being connected within the table to a vacuum line so that the glass sheet 16 may be firmly held onto the surface by vacuum. A pneumatic cylinder 18 is mounted at the end of the base 10, and has a piston rod 19 linked to the table 15, the cylinder being capable of moving the cutting table along the guide bars 12 from a loading and unloading position (shown in full lines) to a second position (shown ghosted).

The guide bars 14 constitute guide means for a carriage 20 equipped with a movable bank of scoring tools 21. A pneumatic cylinder 22 is mounted so as to extend outwardly from the side member 13, and has a piston rod linked to move the carriage 20 over the length of the cutting table while the cutting table is in its second position. The tools 21 are spaced apart in a direction perpendicular to the direction of movement of the carriage 20, and are adjustable in height so that, with the cutting table in its second position, movement of the carriage 20 along the guide bars 14 causes the tools 21 to score a plurality of parallel lines on the glass sheet 16.

As shown in FIG. 3 the tools 21 are each held in a tool holder 26 which is pivotally attached to a mounting 27 clamped to the carriage 20. The holder 26 is normally held with the tool in the lowered cutting position by means of spring 28, this position being adjustable by screw 29. The tool may however be raised into the inoperative position by a horizontal rod 30 acting on the end of holder 26, this action causing the holder 26 to pivot in its mounting. The rod 30 is eccentrically mounted on a disc 31 rotatable by a lever 32, which when in the ghosted position holds the tool 21 in the raised position. The lever 32 is arranged to be movable by fixed stops positioned at each end of the stroke of carriage 20, so that on the outwards stroke (in the direction of arrow A) the lever is in the position as shown in full lines and the tools 21 are lowered, and when this stroke is completed the lever 32 raises the tools for the return stroke.

A fixed bank of scoring tools 24 is mounted on a bar 25 extending across the guide bars 12, the tools being evenly spaced along a length slightly less than that of the cutting table. The scoring tools 24 are vertically positioned so as to score a plurality of parallel lines on the glass sheet as the table holding the glass sheet moves from its second position (as shown ghosted) to the loading and unloading position.

The tools 24 are also each pivotally mounted and spring biassed in the downwards direction, and are arranged to be raised clear of the glass sheet by means similar to that described for tools 21. In this case, however, the lever which operates the eccentrically mounted rod is movable by a pneumatic cylinder 33.

The pneumatic cylinders 18 and 22, which respectively effect movement of the cutting table and the carriage 20, are each provided with flow regulating means comprising two regulators in parallel in the exhaust line thereof. For each cylinder, one of these regulators is permanently open and is set to allow the cutting table or carriage, as the case may be, to move at a slow speed at which the tools can run onto the glass without causing damage to the edges of the glass. The second regulator for each cylinder is arranged so that when this is open the cylinders 18 and 22 can move the cutting table and carriage, respectively, at a faster speed.

The second regulators for cylinders 18 and 22 are operable by pilot valves 34 and 35 respectively. A linear cam 36 is so shaped and positioned as to operate pilot valve 35 in such manner that the second regulator of cylinder 22 remains closed until the tools 21 have just run on to the glass sheet at slow speed, after which pilot valve 35 is released and opens the second regulator of cylinder 22 so that the carriage 20 then performs its cutting stroke at the full cutting speed. Similarly, a liner cam 37 is shaped and positioned to operate pilot valve 34, which valve regulates the speed of the cutting table by its control of the second regulator of cylinder 18. In this case, however, cam 37 is so arranged in relation to valve 34 that the table first moves at a fast approach speed until the glass sheet is near to the tools 24, then at a slower speed for the cutting operation. The cam 37 may be further arranged to increase the speed of cutting once the tools have moved onto the glass.

The pneumatic cylinders 18, 22 and 33 are interlinked in a pneumatic circuit which also includes control valves (not shown) which are themselves linked to pilot valves 40, 41, 42 and 43. Pilot valve 40 is hand operated, pilot valve 41 is operated by the cutting table when this reaches its second position, pilot valve 42 is operated by the carriage 20 at the completion of its cutting stroke, and pilot valve 43 is operated by the cutting table when this reaches the loading and unloading position. The manner in which these controls are sequentially operated is described hereinafter.

In operation, a sheet of glass 16 is placed on the cutting table 15 when in its loading position, where it is readily accessible, and the glass sheet is located by hand against the stops on the table. Pilot valve 40 is then pressed to connect a vacuum line to the ports 17 of the table, and to supply air to a four-way control valve.

The pilot valve 40 also actuates cylinder 33 to raise the bank of tools 24, and through a delay device operates a second control valve. This second control valve actuates cylinder 18 to move the table 15 into its second position, while the tools of the tool bank 24 are clear of the glass sheet 16. At the end of its movement the cutting table opens the pilot valve 41, whereby the cylinder 22 is actuated to move the carriage 20 along the guide bars 14 at speeds controlled by the cam 36 in the manner described, causing the tools of tool bank 21 to score a plurality (in this case 5) of parallel lines along the length of the glass sheet. The use of a slow approach speed on this cutting stroke, as described above, prevents any chipping of the edge of the glass sheet. At the end of the cutting stroke, the tools of bank 21 are raised by the lever operated mechanism described, and the pilot valve 42 is operated by the carriage 20, causing the carriage 20 to return to the starting position. Simultaneously with this return stroke, the pilot valve 42 also actuates cylinder 33 to lower the tool bank 24, and further actuates cylinder 18 to move the cutting table up to and under the tool bank 24, at speeds regulated by the cam 37 in the manner described above. In this movement a plurality of parallel lines (in this case 13) are scored on the glass sheet 16 by the tools of tool bank 24 in their lowered position. At the end of this cutting stroke the cutting table operates pilot valve 43, releasing the vacuum applied to the ports of the table. The scored glass sheet is then removed from the cutting table and passed to known breaking out apparatus which, by bending the sheet successively in mutually perpendicular planes, divides the sheet into small rectangular pieces suitable for microscope slide cover slips.

In a modification of the apparatus described, a roller having a resilient surface, e.g. of soft rubber, is disposed transversely to the guide bars 12, and is so positioned that the roller lightly contacts the top surface of the glass sheet 16 as it moves from the loading position to its second position, thereby ensuring that the glass is in close contact with the surface of the table. The roller preferably extends at right angles to the bars 12.

Figure 4:
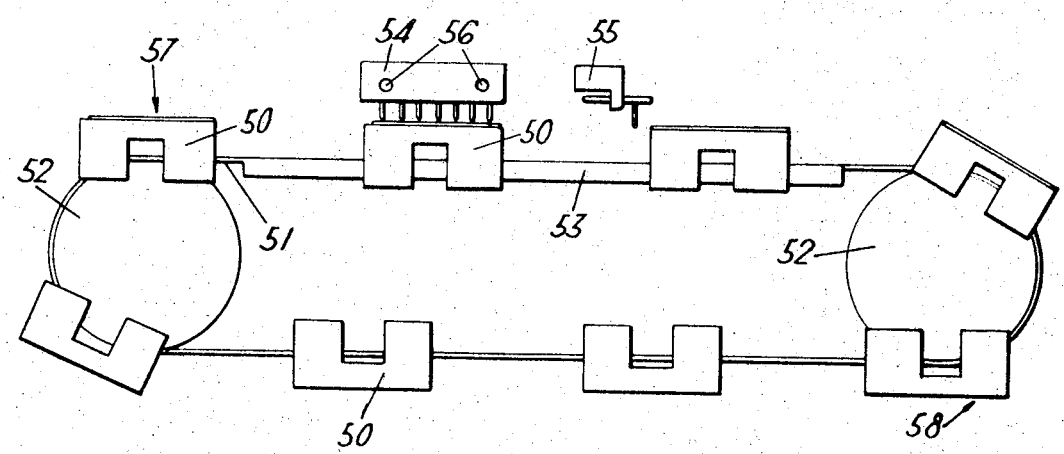
FIG. 4 shows a diagrammatic side elevation of a second type of apparatus according to the invention.

In the embodiment shown diagrammatically in FIG. 4, a plurality (in this case 8) of cutting tables 50 are mounted on an endless conveyor belt 51 supported on pulleys 52. The conveyor belt passes between guide means in the form of guide bars 53 which support the cutting tables as they pass along the upper reach of the conveyor. Each of the cutting tables 50 has ports in its surface communicating with a vacuum line, whereby thin glass sheets may be held on the flat surfaces of the tables by suction. Two banks of scoring tools 54 and 55 are mounted above the guide bars 53, namely a movable bank 54 mounted for movement on guide bars 56 transverse to the conveyor, and a fixed bank 55. The tools of both banks are at such a height as to score glass sheets carried by the tables 50 when the tables are supported by the bars 53. The movable bank of tools 54 is provided with a pneumatic cylinder (not shown) capable of moving the tools along bars 56 to score across a glass sheet, and this cylinder is controlled by automatic sequencing means which also control the conveyor movement. Loading and unloading stations 57 and 58 respectively are provided, the loading station being above one pulley 52, and the unloading station being situated beneath the other pulley 52.

In operation the conveyor moves intermittently by equal distances, so that each cutting table 50 is successively held stationary for an interval at the loading station 57, then under the movable tool bank 54, then at two positions between the fixed tool bank 55 and the unloading station 58, and finally at the unloading station.

At the loading station 57 a first glass sheet is located by hand on a cutting table 50, after which vacuum is applied to the ports of the table to hold the glass in place. In the next position the first glass sheet is scored with a plurality of parallel lines running transversely to the direction of conveyor movement by the movable bank of tools 54. In moving to the next stage the cutting table passes under the fixed tool bank 55, the tools of which score a plurality of parallel lines in the direction of conveyor movement. In the last stage when the cutting table reaches the unloading station 58, the vacuum is released and the glass sheet drops off the now inverted cutting table onto a receiving belt. At each halt in the conveyor movement, another glass sheet is placed on whichever cutting table is at the loading station, so as to follow the first glass sheet through the scoring stages described.

The conveyor-type apparatus described is particularly suitable for operation in conjunction with an automatic breaking-out machine, which receives on a belt the scored glass sheet from the unloading station 58. The glass sheet is then passed on the belt between rollers whereby the sheet is bent in mutually perpendicular planes to break it along the score lines, so producing small pieces of glass of square or rectangular shape.

We claim:

1. A method of scoring a plurality of intersecting lines on a glass sheet, e.g. for cutting microscope slide cover slips from a thin glass sheet, comprising the steps of locating the glass sheet on a cutting table, applying vacuum to ports in said table to hold the glass sheet in position thereon, effecting relative movement between said table and a first bank of scoring tools to score a first plurality of parallel lines in one direction on the glass sheet, then effecting relative movement between said table and a second bank of scoring tools to score on said glass sheet a second plurality of parallel lines intersecting said first lines, the relative movement between the cutting table and at least one of the banks of scoring tools being effected first at a slow approach speed until the tools contact the edge of the glass sheet and have attained the correct height for scoring, and subsequently at a faster speed during the scoring operation, releasing the vacuum holding the glass sheet on the table, and removing the scored glass sheet from the table.

2. A method according to claim 1, wherein the relative movement between said table and one bank of scoring tools is caused by traversing the one bank of scoring tools over the glass sheet while the cutting table is held stationary, and the relative movement between the cutting table and the other bank of scoring tools is caused by traversing the cutting table under said other bank of scoring tools, which other bank remains stationary.

3. Apparatus for scoring a plurality of intersecting lines on a glass sheet, comprising a base first guide means mounted on the base, a cutting table movable in a first direction on said first guide means, said cutting table having ports in its surface connected to a vacuum line for holding a glass sheet on the cutting table surface by vacuum, second guide means mounted on said base, a carriage movable on said second guide means in a second direction over said cutting table, a movable bank of scoring tools mounted on said carriage and arranged to score a plurality of parallel lines on the glass sheet, a fixed bank of scoring tools so positioned as to score a plurality of parallel lines on the glass sheet in said first direction as the cutting table is moved along said first guide means, and means for moving at least one of the cutting table and the movable bank of scoring tools which means provide a slow approach speed until the scoring tools have contacted the edge of the glass sheet, and a faster speed during scoring.

4. Apparatus according to claim 3, in which the said first guide means allow movement of the cutting table under the fixed bank of scoring tools from a first loading and unloading position to a second position in which a glass sheet on the cutting table may be traversed by the movable bank of scoring tools.

5. Apparatus according to claim 3, wherein both the cutting table and the movable bank of scoring tools are movable by pneumatic cylinders having flow regulating means which provide a slow approach speed until the scoring tools have contacted the edge of the glass sheet, and a faster speed during scoring.

6. Apparatus for scoring a plurality of intersecting lines on a glass sheet, comprising a plurality of cutting tables mounted in succession on an endless conveyor belt, each cutting table having ports in its surface connected to a vacuum line for holding a glass sheet on the cutting table surface by vacuum, and first guide means associated with the conveyor belt along which the cutting tables are guided in a first direction beneath movable and fixed banks of scoring tools, said movable bank of scoring tools being mounted on a carriage movable on second guide means in a second direction transverse to said first direction and over each glass sheet in turn to score a plurality of parallel lines on the glass sheet in said second direction while the conveyor is stationary, and said fixed bank of scoring tools being positioned to score a further plurality of lines on the glass sheet in said first direction when the conveyor moves beneath said fixed bank.

7. A method of scoring a plurality of intersecting lines on a glass sheet, e.g. for cutting microscope slide cover slips from a thin glass sheet, comprising the steps of, for each table in turn of a succession of cutting tables mounted on an endless conveyor belt, locating a glass sheet on said table, applying vacuum to ports in said table to hold the glass sheet in position thereon, effecting movement of a first bank of scoring tools over said table while said table remains stationary to score a first plurality of parallel lines in one direction on the glass sheet, effecting movement of said table under a second bank of scoring tools while said second bank remains stationary to score on said glass sheet a second plurality of parallel lines intersecting said first lines, releasing the vacuum holding the glass sheet on the table, and removing the scored glass sheet from the table.

8. A method of scoring a plurality of intersecting lines on a glass sheet, e.g. for cutting microscope slide cover slips from a thin glass sheet, comprising the steps of locating the glass sheet on a table, applying vacuum to ports in said table to hold the glass sheet in position thereon, effecting movement of said table under a first bank of scoring tools while said first bank remains stationary, effecting movement of a second bank of scoring tools over said table while the cutting table is held stationary, effecting return movement of said table under said first bank of scoring tools while said first bank remains stationary, whereby a plurality of parallel lines are scored in one direction on the glass sheet by said first bank of scoring tools and a further plurality of parallel lines intersecting said first-mentioned lines are scored on said glass sheet by said second bank of scoring tools, releasing the vacuum holding the glass sheet on the table, and removing the scored glass sheet from the table.

9. A method according to claim 8, wherein said first-mentioned plurality of parallel lines are scored on the glass sheet during said return movement of said table under said first bank of scoring tools, said first bank of scoring tools being held inoperative during said first movement of said table under said first bank of scoring tools.

10. Apparatus for scoring a plurality of intersecting lines on a glass sheet, comprising a base, first guide means mounted on the base, a cutting table movable in a first direction on said first guide means between a first position and a second position, said cutting table having ports in its surface connected to a vacuum line for holding a glass sheet on the cutting table surface by vacuum, second guide means mounted on said base at said second position, a carriage movable on said second guide means in a second direction over said cutting table, a movable bank of scoring tools mounted on said carriage and arranged to score a plurality of parallel lines on the glass sheet, and a fixed bank of scoring tools arranged over said cutting table to score a plurality of parallel lines on the glass sheet in said first direction as the cutting table is returned along said first guide means from said second position to said first position, and means for holding said fixed bank of scoring tools inoperative during movement of the cutting table along said first guide means from said first position to said second position.